(12) United States Patent
Li

(10) Patent No.: US 11,825,341 B2
(45) Date of Patent: Nov. 21, 2023

(54) DATA TRANSMISSION METHOD AND APPARATUS, AND STORAGE MEDIUM

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 406 days.

(21) Appl. No.: 17/344,814

(22) Filed: Jun. 10, 2021

(65) Prior Publication Data

US 2021/0306097 A1    Sep. 30, 2021

Related U.S. Application Data

(63) Continuation of application No. PCT/CN2018/123524, filed on Dec. 25, 2018.

(51) Int. Cl.
*H04B 7/0413* (2017.01)
*H04B 7/06* (2006.01)
(Continued)

(52) U.S. Cl.
CPC .......... *H04W 28/06* (2013.01); *H04B 7/0413* (2013.01); *H04B 7/0608* (2013.01);
(Continued)

(58) Field of Classification Search
CPC ...... H04B 7/02–12; H04L 1/0001–248; H04L 5/0001–26; H04L 25/02–4975;
(Continued)

(56) References Cited

U.S. PATENT DOCUMENTS

| 9,590,765 B2 | 3/2017 | Pi et al. |
| 2010/0020893 A1* | 1/2010 | Hoshino ................. H04B 7/04 |

(Continued)

FOREIGN PATENT DOCUMENTS

CN    105187174 B    11/2018

OTHER PUBLICATIONS

Indian Patent Application No. 202147030323, Office Action dated Mar. 8, 2022, 5 pages.

(Continued)

*Primary Examiner* — Timothy J Weidner
(74) *Attorney, Agent, or Firm* — COZEN O'CONNOR

(57) ABSTRACT

A data transmission method includes: performing rate matching on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot; transmitting the target codeword in the available time-domain resources of the target time slot through a first set of antenna components and a pre-configured second set of antenna components respectively; in which, the first set of antenna components and the second set of antenna components have the same hardware configuration information and resource allocation information. An apparatus and storage medium are also disclosed.

15 Claims, 6 Drawing Sheets rate matching is performed on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot — 101 the target codeword is transmitted respectively in the available time-domain resources of the target time slot through a first set of antenna components and a pre-configured second set of antenna components; in which, the first set of antenna components and the second set of antenna components have the same hardware configuration information and resource allocation information — 102

(51) Int. Cl.
  *H04L 1/00* (2006.01)
  *H04L 1/22* (2006.01)
  *H04L 27/26* (2006.01)
  *H04L 27/34* (2006.01)
  *H04W 28/04* (2009.01)
  *H04W 28/06* (2009.01)
  *H04W 72/0446* (2023.01)
  *H04W 72/0453* (2023.01)
  *H04W 72/044* (2023.01)
  *H04W 72/51* (2023.01)
  *H04W 84/02* (2009.01)
  *H04W 88/02* (2009.01)
  *H04W 88/08* (2009.01)
  *H04W 92/02* (2009.01)
  *H04W 92/10* (2009.01)

(52) U.S. Cl.
  CPC ............ *H04L 1/009* (2013.01); *H04L 1/0067* (2013.01); *H04L 1/0068* (2013.01); *H04L 1/22* (2013.01); *H04L 27/2634* (2013.01); *H04L 27/3444* (2013.01); *H04W 28/04* (2013.01); *H04W 72/0446* (2013.01); *H04W 72/0453* (2013.01); *H04W 72/0466* (2013.01); *H04W 72/51* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC ............... H04L 2025/0335–03815; H04L 27/0002–389; H04L 2027/0016–0097; H04W 28/02–26; H04W 72/02–569; H04W 84/005–22; H04W 88/005–188; H04W 92/02–24
  See application file for complete search history.

(56) References Cited

U.S. PATENT DOCUMENTS

2010/0239040 A1* 9/2010 Beluri ................ H04B 7/0404
2017/0134109 A1* 5/2017 Hwang ............... H04B 7/0452

OTHER PUBLICATIONS

European Patent Application No. 18945034.9, Search and Opinion dated Jul. 19, 2022, 13 pages.

Dammann, A., et al. "Transmit/Receive-Antenna Diversity Techniques for OFDM Systems" European Transactions on Telecommunications, Wiley & Sons, Chichester, GB, Sep. 1, 2002, vol. 13, No. 5, pp. 531-538.

* cited by examiner

101 — rate matching is performed on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot 102 — the target codeword is transmitted respectively in the available time-domain resources of the target time slot through a first set of antenna components and a pre-configured second set of antenna components; in which, the first set of antenna components and the second set of antenna components have the same hardware configuration information and resource allocation information

FIG. 1

201 — rate matching is performed on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot 202 — modulation mapping is performed on a scrambling code bit block of the target codeword to generate a first complex modulation symbol block of the target codeword 203 — phase rotation is performed on each data in the first complex modulation symbol block of the target codeword according to a target angle to obtain a second complex modulation symbol block of the target codeword 204 — the first complex modulation symbol block of the target codeword is transmitted in the available time-domain resources of the target time slot through the first set of antenna components, and the second complex modulation symbol block of the target codeword is transmitted in the available time-domain resources of the target time slot through the pre-configured second set of antenna components

FIG. 2

DATA TRANSMISSION METHOD AND APPARATUS, AND STORAGE MEDIUM

CROSS-REFERENCE TO RELATED APPLICATION

This application is a continuation application of International Application No. PCT/CN2018/123524, filed on Dec. 25, 2018, the entire contents of which are incorporated herein by reference.

TECHNICAL FIELD

The present disclosure relates to a field of communication technology, in particular to wireless data transmission method and apparatus, and storage medium.

BACKGROUND

Different service types have different service quality requirements for wireless communication technologies. For example, requirements of the service type such as enhanced Mobile Broad Band (eMBB) focus on large bandwidth, high speed, etc., while requirements of the service type such as Ultra Reliable Low Latency Communication (URLLC) focus on high reliability and low latency, and requirements of the service type such as massive machine type of communication (mMTC) focus on the large number of connections. Therefore, the new generation of wireless communication systems needs to support the transmission of multiple service types through flexible and configurable designs.

SUMMARY

The present disclosure provides a data transmission method and apparatus, and a storage medium. The technical solution is descried as follows.

According to embodiments of the present disclosure, a data transmission method is provided. The method includes: performing rate matching on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot; and transmitting the target codeword in the available time-domain resources of the target time slot through a first set of antenna components and a pre-configured second set of antenna components respectively; in which, the first set of antenna components and the second set of antenna components have the same hardware configuration information and resource allocation information.

According to the embodiments of the present disclosure, a data transmission apparatus is provided. The apparatus includes: a processor; and a memory configured to store instructions executable by the processor; in which the processor is configured to: perform rate matching on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot; and transmit the target codeword in the available time-domain resources of the target time slot through a first set of antenna components and a pre-configured second set of antenna components respectively; in which, the first set of antenna components and the second set of antenna components have the same hardware configuration information and resource allocation information.

According to embodiments of the present disclosure, a non-transitory computer-readable storage medium is provided. The medium has computer instructions stored thereon, in which when the instructions are executed by a processor, a data transmission method is implemented. The method includes: performing rate matching on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot; and transmitting the target codeword in the available time-domain resources of the target time slot through a first set of antenna components and a pre-configured second set of antenna components respectively; in which, the first set of antenna components and the second set of antenna components have the same hardware configuration information and resource allocation information.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIG. 1 is a flowchart showing a data transmission method according to an exemplary embodiment.

FIG. 2 is a flowchart showing a data transmission method according to an exemplary embodiment.

DETAILED DESCRIPTION

Figure 3:
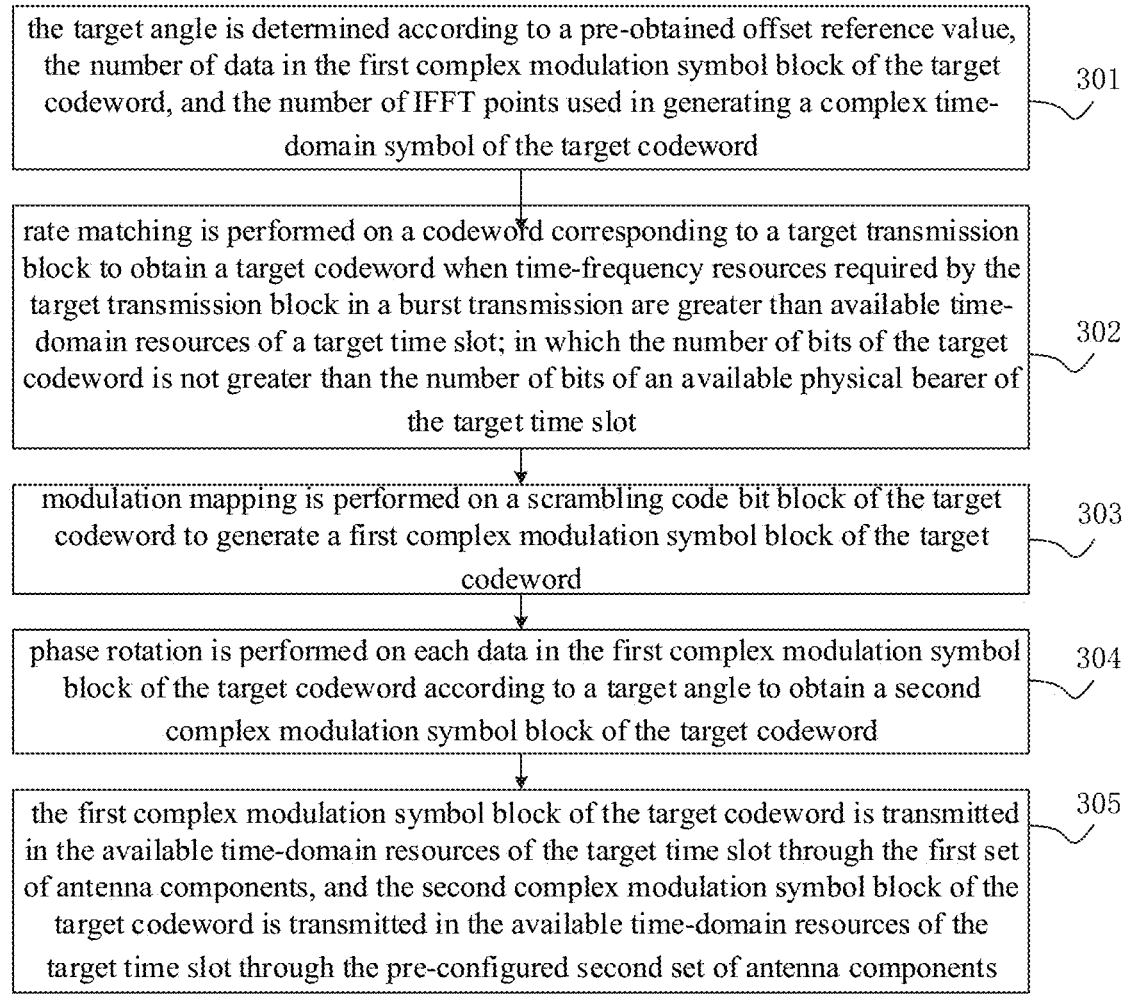
FIG. 3 is a flowchart showing a data transmission method according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In related arts, in the mapping type B of Physical Downlink Shared CHannel (PDSCH)/Physical Uplink Shared CHannel (PUSCH), it is allowed to start the transmission from any symbol of a slot. For PDSCH transmission, the allowable transmission duration can be 2 symbols, 4 symbols or 7 symbols, and the allowable transmission time for PUSCH can be any value of 1-14 symbols; at the same time, it is stipulated that a transmission burst cannot cross the edge of the slot in related arts. However, if the physical resources available in the current slot are less than the physical resources actually needed, the bit rate of the rate matching output will increase, and the transmission quality will deteriorate. This makes it difficult to meet the high reliability and service quality requirements of service types such as URLLC and eURLLC.

Embodiments of the present disclosure provides a data transmission method, including: performing rate matching on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot; and transmitting the target codeword in the available time-domain resources of the target time slot through a first set of antenna components and a pre-configured second set of antenna components respectively; in which, the first set of antenna components and the second set of antenna components have the same hardware configuration information and resource allocation information. With the data transmission method provided in embodiments of the present disclosure, two sets of antenna components with the same hardware configuration information and resource allocation information are used to respectively transmit the target codeword after the rate matching, and the transmit diversity gain can be obtained, so as to ensure the reliability of the service in the scenario where the time-frequency resources actually required for burst transmission are greater than the available time-domain resources of the target time slot, thereby improving the transmission quality.

It should be noted that the data transmission method provided by the embodiments of the present disclosure can be applied to a 3G/4G/5G communication network; the terminals involved in the present disclosure may include electronic devices such as smart phones, in-vehicle devices, smart home appliances, notebooks, or smart wearable devices; the network access devices involved in the present disclosure may include communication devices that provide wireless access services for terminals, such as base stations or relay stations.

Based on the above analysis, the specific embodiments are proposed as follows.

FIG. 1 is a flowchart showing a data transmission method according to an exemplary embodiment. The execution subject of the data transmission method may be a terminal or a network access device. As shown in FIG. 1, the method includes the following steps 101-102.

In step 101, rate matching is performed on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot.

For example, the burst transmission may include uplink burst transmission or downlink burst transmission. The execution subject of this embodiment may be a terminal or a network access device.

In step 102, the target codeword is transmitted respectively in the available time-domain resources of the target time slot through a first set of antenna components and a pre-configured second set of antenna components; in which, the first set of antenna components and the second set of antenna components have the same hardware configuration information and resource allocation information.

For example, two sets of antenna components with the same hardware configuration information and resource allocation information are configured on the terminal or network access device. When the time-frequency resources required by the target transmission block in the burst transmission are greater than the available time-domain resources of the target time slot, the target codeword is transmitted respectively in the available time-domain resources of the target time slot through the first set of antenna components and the pre-configured second set of antenna components, thereby obtaining transmit diversity gain.

With the technical solution provided by the embodiments of the present disclosure, two sets of antenna components with the same hardware configuration information and resource allocation information are used to respectively transmit the target codeword after the rate matching, and the transmit diversity gain can be obtained, so as to ensure the reliability of the service in the scenario where the time-frequency resources actually required for burst transmission are greater than the available time-domain resources of the target time slot, thereby improving the transmission quality.

FIG. 2 is a flowchart showing a data transmission method according to an exemplary embodiment. As shown in FIG. 2, the method includes the following steps 201-204.

In step 201, rate matching is performed on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot.

In step 202, modulation mapping is performed on a scrambling code bit block of the target codeword to generate a first complex modulation symbol block of the target codeword.

For example, the coded bit block of the target codeword is scrambled to obtain the scrambled bit block of the target codeword.

For example, the modulation mapping manners may include: Binary Phase Shift Keying (BPSK), Quadrature Phase Shift Keying (QPSK), and 16 Quadrature Amplitude Modulation (QAM), or 64QAM.

In step 203, phase rotation is performed on each data in the first complex modulation symbol block of the target codeword according to a target angle to obtain a second complex modulation symbol block of the target codeword.

For example, the phase of the data in the second complex modulation symbol block and the phase of the corresponding data in the first complex modulation symbol block differ by a target angle. The method for determining the target angle will be described in the embodiment of FIG. 3 below.

In step 204, the first complex modulation symbol block of the target codeword is transmitted in the available time-domain resources of the target time slot through the first set of antenna components, and the second complex modulation symbol block of the target codeword is transmitted in the available time-domain resources of the target time slot through the pre-configured second set of antenna components.

With the technical solution provided by the embodiments of the present disclosure, the second complex modulation symbol block of the target codeword is obtained after performing phase rotation on each data in the first complex modulation symbol block of the target codeword, such that the phase of the data in the second complex modulation symbol block and the phase of the corresponding data in the first complex modulation symbol block differ by a target angle, thereby reducing the interference of the transmitted signal between the first set of antenna components and the second set of antenna components, and improving the transmission quality.

FIG. 3 is a flowchart showing a data transmission method according to an exemplary embodiment. Based on the embodiment shown in FIG. 2, as shown in FIG. 3, the method includes the following steps 301-305.

In step 301, the target angle is determined according to a pre-obtained offset reference value, the number of data in the first complex modulation symbol block of the target codeword, and the number of Inverse Fast Fourier Transform (IFFT) points used in generating a complex time-domain symbol of the target codeword.

For example, the specific value of the offset reference value may be predetermined on the network access device side, and when the network access device allocates wireless resources for the terminal, the offset reference value may be notified to the terminal.

Suppose that the data in the first complex modulation symbol block of the target codeword after the modulation mapping on the first set of antenna components are $x_1, x_2, \ldots x_n$, and the data in the second complex modulation symbol block of the target codeword after the modulation mapping on the second set of antenna components are $x_1 \times e^{j\varphi}, x_2 \times e^{j\varphi}, \ldots x_n \times e^{j\varphi}$, where $\varphi$ is the target angle, and the following formula can be used to calculate the target angle $\varphi$:

$$\varphi = \frac{2\pi k n}{N},$$

where k is the offset reference value, k is a non-zero integer, n is the number of scrambling code bits of the target codeword, and N is the number of IFFT points used generating a complex time-domain symbol of the target codeword.

In step 302, rate matching is performed on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot. In step 303, modulation mapping is performed on a scrambling code bit block of the target codeword to generate a first complex modulation symbol block of the target codeword.

In step 304, phase rotation is performed on each data in the first complex modulation symbol block of the target codeword according to a target angle to obtain a second complex modulation symbol block of the target codeword.

In step 305, the first complex modulation symbol block of the target codeword is transmitted in the available time-domain resources of the target time slot through the first set of antenna components, and the second complex modulation symbol block of the target codeword is transmitted in the available time-domain resources of the target time slot through the pre-configured second set of antenna components.

With the technical solution provided by the embodiments of the present disclosure, the offset reference value is obtained, and the target angle is determined according to the offset reference value, the number of data in the first complex modulation symbol block of the target codeword, and the number of the IFFT points used in generating a complex time-domain symbol of the target codeword, thereby simplifying the implementation of the solution.

Figure 4:
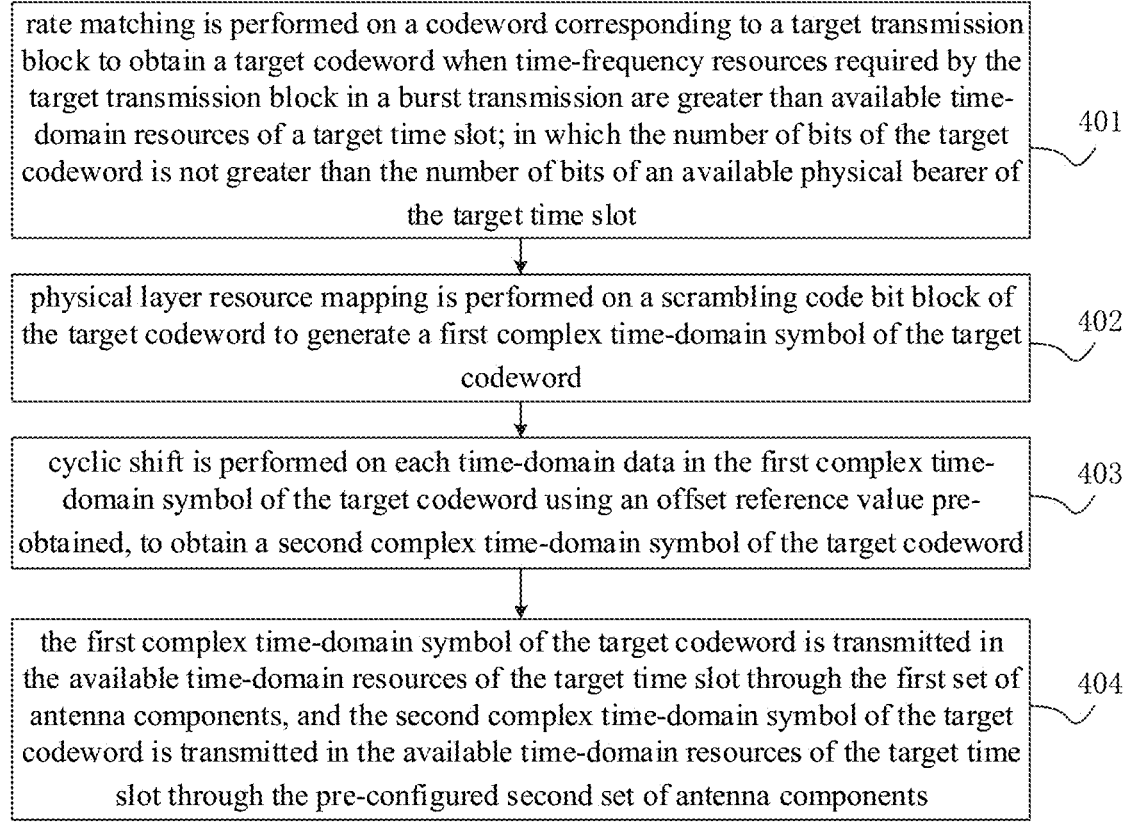
FIG. 4 is a flowchart showing a data transmission method according to an exemplary embodiment.

FIG. 4 is a flowchart showing a data transmission method according to an exemplary embodiment. As shown in FIG. 4, the method includes the following steps 401-404.

In step 401, rate matching is performed on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot.

In step 402, physical layer resource mapping is performed on a scrambling code bit block of the target codeword to generate a first complex time-domain symbol of the target codeword.

For example, the coded bit block of the target codeword is scrambled to obtain the scrambled bit block of the target codeword.

In step 403, cyclic shift is performed on each time-domain data in the first complex time-domain symbol of the target codeword using an offset reference value pre-obtained, to obtain a second complex time-domain symbol of the target codeword.

For example, each time-domain data in the first complex time-domain symbol of the target codeword is cyclically shifted, to obtain the time-domain data of the second complex time-domain symbol of the target codeword. The number of cyclically shifted bits of each time-domain data in the first complex time-domain symbol of the target codeword is equal to the offset reference value.

In step 404, the first complex time-domain symbol of the target codeword is transmitted in the available time-domain resources of the target time slot through the first set of antenna components, and the second complex time-domain symbol of the target codeword is transmitted in the available time-domain resources of the target time slot through the pre-configured second set of antenna components.

With the technical solution provided by the embodiment of the present disclosure, by cyclically shifting each time-domain data in the first complex time-domain symbol of the target codeword to obtain the time-domain data of the second complex time-domain symbol of the target codeword, the transmission signal interference between the first set of antenna components and the second set of antenna components can be reduced, thereby improving the transmission quality.

The following are apparatus embodiments of the present disclosure, which can be used to implement the method embodiments of the present disclosure.

Figure 5:
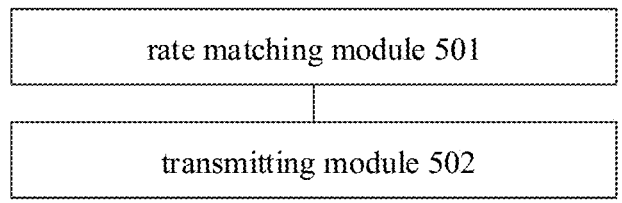
FIG. 5 is a block diagram showing a data transmission apparatus according to an exemplary embodiment.

FIG. 5 is a block diagram showing a data transmission apparatus according to an exemplary embodiment. The apparatus can be applied to a terminal or a network access device. Referring to FIG. 5, the data transmission apparatus includes: a rate matching module 501 and a transmitting module 502.

The rate matching module 501 is configured to perform rate matching on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot.

The transmitting module 502 is configured to transmit the target codeword in the available time-domain resources of the target time slot through a first set of antenna components and a pre-configured second set of antenna components respectively; in which, the first set of antenna components and the second set of antenna components have the same hardware configuration information and resource allocation information.

With the apparatus provided by the embodiments of the present disclosure, two sets of antenna components with the same hardware configuration information and resource allocation information are used to respectively transmit the target codeword after the rate matching, and the transmit diversity gain can be obtained, so as to ensure the reliability of the service in the scenario where the time-frequency resources actually required for burst transmission are greater than the available time-domain resources of the target time slot, thereby improving the transmission quality.

Figure 6:
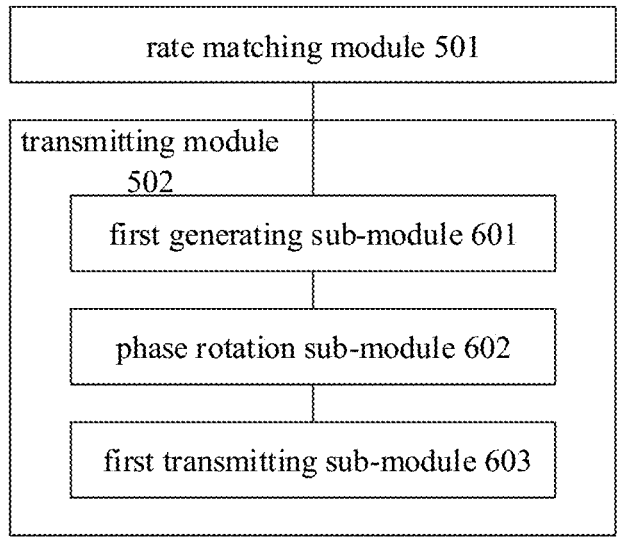
FIG. 6 is a block diagram showing a data transmission apparatus according to an exemplary embodiment.

In an embodiment, as shown in FIG. 6, the data transmission apparatus shown in FIG. 5 may further configures the transmitting module 502 to include: a first generating sub-module 601, a phase rotation sub-module 602, and a first transmitting sub-module 603.

The first generating submodule 601 is configured to perform modulation mapping on a scrambling code bit block of the target codeword to generate a first complex modulation symbol block of the target codeword.

The phase rotation sub-module 602 is configured to perform phase rotation on each data in the first complex modulation symbol block of the target codeword according to a target angle to obtain a second complex modulation symbol block of the target codeword.

The first transmitting sub-module 603 is configured to transmit the first complex modulation symbol block of the target codeword in the available time-domain resources of the target time slot through the first set of antenna components, and to transmit the second complex modulation symbol block of the target codeword in the available time-domain resources of the target time slot through the pre-configured second set of antenna components.

Figure 7:
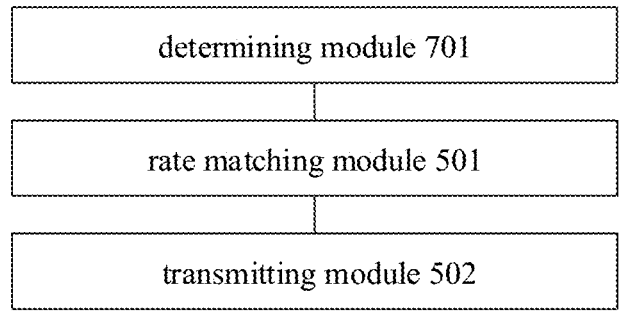
FIG. 7 is a block diagram showing a data transmission apparatus according to an exemplary embodiment.

In an embodiment, as shown in FIG. 7, the data transmission apparatus shown in FIG. 5 may further include: a determining module 701, configured to determine the target angle according to a pre-obtained offset reference value, the number of data in the first complex modulation symbol block of the target codeword, and the number of Inverse Fast Fourier Transform (IFFT) points used in generating a complex time-domain symbol of the target codeword.

Figure 8:
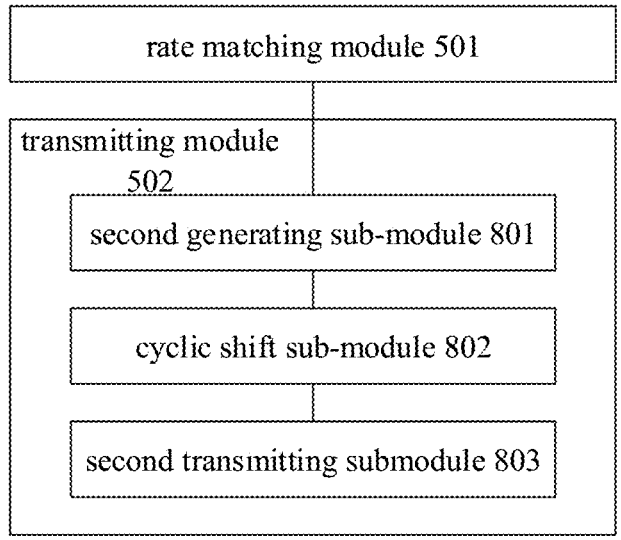
FIG. 8 is a block diagram showing a data transmission apparatus according to an exemplary embodiment.

In an embodiment, as shown in FIG. 8, the data transmission apparatus shown in FIG. 5 may further configures the transmitting module 502 to include: a second generating sub-module 801, a cyclic shift sub-module 802, and a second transmitting submodule 803.

The second generating submodule 801 is configured to perform physical layer resource mapping on a scrambling code bit block of the target codeword to generate a first complex time-domain symbol of the target codeword.

The cyclic shift sub-module 802 is configured to perform cyclic shift on each time-domain data in the first complex time-domain symbol of the target codeword using an offset reference value pre-obtained, to obtain a second complex time-domain symbol of the target codeword.

The second transmitting sub-module 803 is configured to transmit the first complex time-domain symbol of the target codeword in the available time-domain resources of the target time slot through the first set of antenna components, and to transmit the second complex time-domain symbol of the target codeword in the available time-domain resources of the target time slot through the pre-configured second set of antenna components.

In an embodiment, the burst transmission includes: an uplink burst transmission or a downlink burst transmission.

Figure 9:
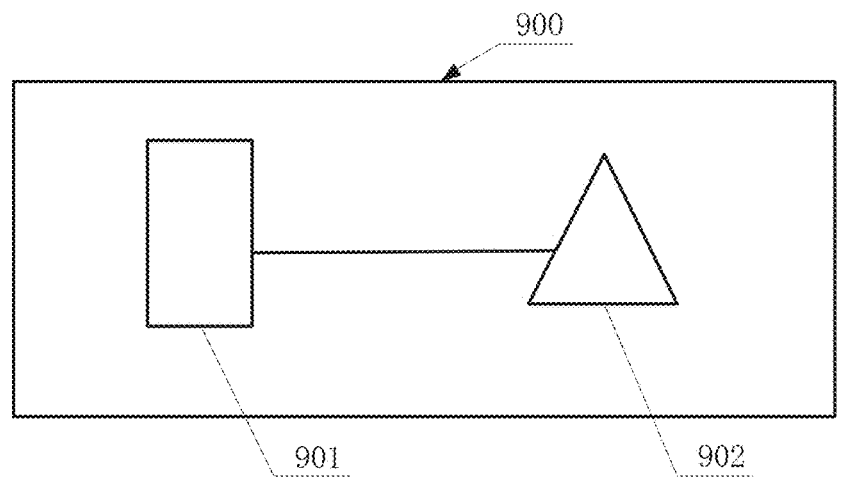
FIG. 9 is a block diagram showing a data transmission apparatus according to an exemplary embodiment.

FIG. 9 is a block diagram showing a data transmission apparatus 900 according to an exemplary embodiment, which is applied to a terminal or a network access device; the data transmission apparatus 900 includes: a processor 901; a memory 902 for storing processor executable instructions; in which, the processor 901 is configured to: perform rate matching on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot; and transmit the target codeword in the available time-domain resources of the target time slot through a first set of antenna components and a pre-configured second set of antenna components respectively; in which, the first set of antenna components and the second set of antenna components have the same hardware configuration information and resource allocation information.

In an embodiment, the aforementioned processor 901 may also be configured to perform acts of: performing modulation mapping on a scrambling code bit block of the target codeword to generate a first complex modulation symbol block of the target codeword; performing phase rotation on each data in the first complex modulation symbol block of the target codeword according to a target angle to obtain a second complex modulation symbol block of the target codeword; transmitting the first complex modulation symbol block of the target codeword in the available time-domain resources of the target time slot through the first set of antenna components, and transmitting the second complex modulation symbol block of the target codeword in the available time-domain resources of the target time slot through the pre-configured second set of antenna components.

In an embodiment, the aforementioned processor 901 may also be configured to perform an act of: determining the target angle according to a pre-obtained offset reference value, the number of data in the first complex modulation symbol block of the target codeword, and the number of Inverse Fast Fourier Transform (IFFT) points used in generating a complex time-domain symbol of the target codeword.

In an embodiment, the processor 901 is also configured to perform acts of: performing physical layer resource mapping on a scrambling code bit block of the target codeword to generate a first complex time-domain symbol of the target codeword; performing cyclic shift on each time-domain data in the first complex time-domain symbol of the target codeword using an offset reference value pre-obtained, to obtain a second complex time-domain symbol of the target codeword; and transmitting the first complex time-domain symbol of the target codeword in the available time-domain resources of the target time slot through the first set of antenna components, and transmitting the second complex time-domain symbol of the target codeword in the available time-domain resources of the target time slot through the pre-configured second set of antenna components.

In an embodiment, the burst transmission includes: an uplink burst transmission or a downlink burst transmission.

The specific manner of performing operations by the respective modules in the apparatus in the foregoing embodiments has been described in detail in the embodiment of the method, which will not be described in detail herein.

Figure 10:
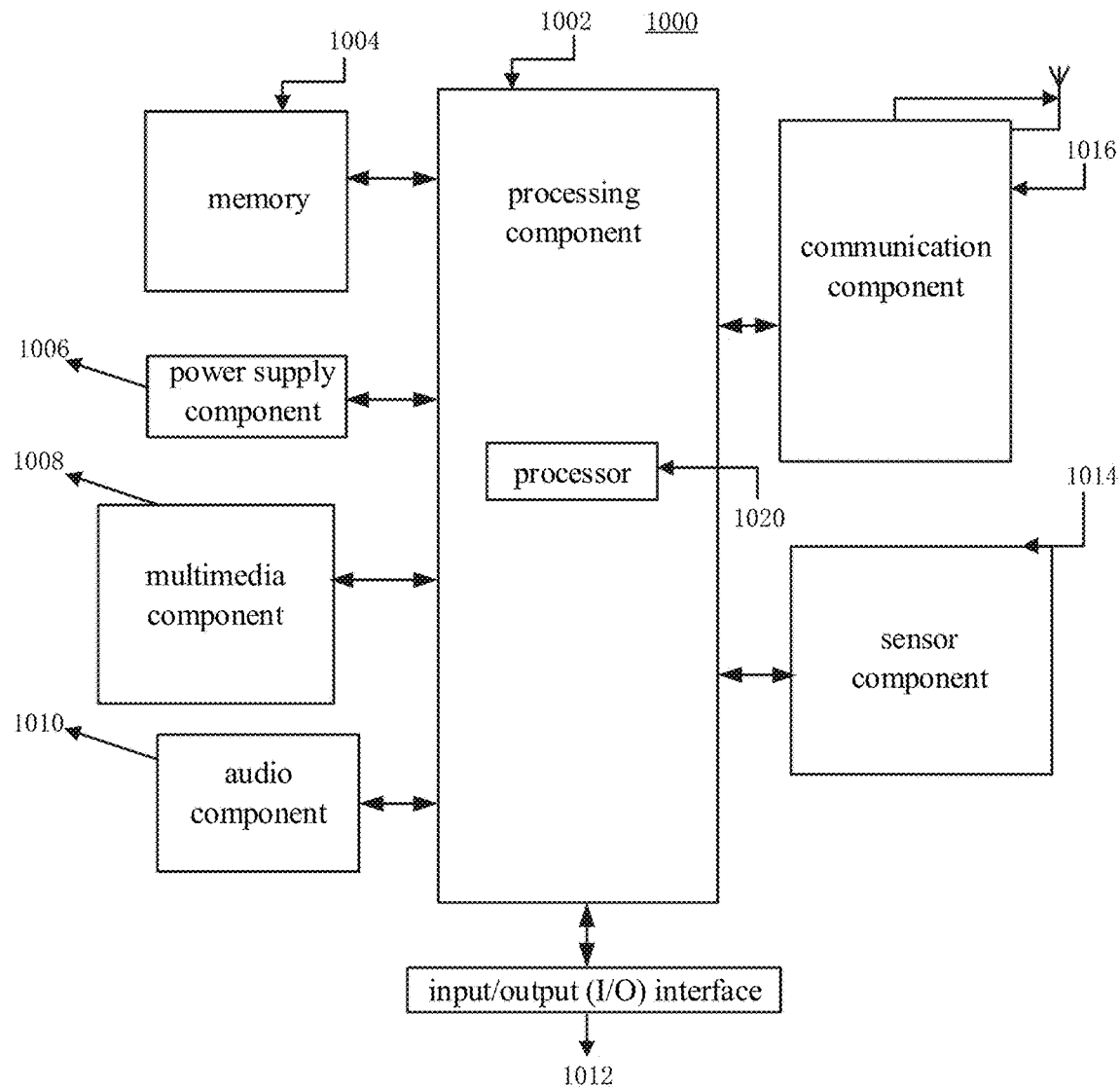
FIG. 10 is a block diagram showing a data transmission apparatus according to an exemplary embodiment.

FIG. 10 is a block diagram showing a data transmission apparatus according to an exemplary embodiment. The data transmission apparatus 1000 is suitable for a terminal; the data transmission apparatus 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 typically controls overall operations of the control apparatus 1000, such as the operations associated with display, telephone calls, data communications, camera operations, and recording operations. The processing component 1002 may include one or more processors 1020 to execute instructions to perform all or part of the blocks in the above methods. Moreover, the processing component 1002 may include one or more modules which facilitate the interaction between the processing component 1002 and other components. For example, the processing component 1002 may include a multimedia module to facilitate the interaction between the multimedia component 1008 and the processing component 1002.

The memory 1004 is configured to store various types of data to support operations on the apparatus 1000. Examples of these data include instructions for any application or method operating on the apparatus 1000, such as contact data, phone book data, messages, pictures, videos, and so on. The memory 1004 can be implemented by any type of volatile or non-volatile storage device or their combination, such as a static random-access memory (SRAM), an electrically erasable programmable read-only memory (EEPROM), an erasable and Programmable read only memory (EPROM), a programmable read only memory (PROM), a read only memory (ROM), a magnetic memory, a flash memory, a magnetic or optical disk.

The power supply component 1006 provides power for various components of the apparatus 1000. The power supply component 1006 may include a power management system, one or more power supplies, and other components associated with the generation, management, and distribution of power in the apparatus 1000.

The multimedia component 1008 includes a screen that provides an output interface between the apparatus 1000 and the user. In some embodiments, the screen may include a liquid crystal display (LCD) and a touch panel (TP). If the screen includes a touch panel, the screen may be used as a touch screen to receive input signals from the user. The touch panel includes one or more touch sensors to sense touch, slide, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and/or the rear camera may receive an external multimedia datum while the apparatus 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone (MIC). When the apparatus 1000 is in an operation mode, such as a call mode, a recording mode, and a voice recognition mode, the microphone is configured to receive external audio signals. The received audio signal may be further stored in the memory 1004 or transmitted via the communication component 1016. In some embodiments, the audio component 1010 further includes a speaker to output audio signals.

The I/O interface 1012 provides an interface between the processing component 1002 and the peripheral interface module. The peripheral interface module may be a keyboard, a click wheel, a button, and so on. These buttons may include but are not limited to: home button, volume button, start button, and lock button.

The sensor component 1014 includes one or more sensors to provide status assessments of various aspects of the apparatus 1000. For example, the sensor component 1014 may detect the on/off state of the apparatus 1000 and relative position of components, for example, components as the display and the keypad of the apparatus 1000. The sensor component 1014 may also detect changes of the position of the apparatus 1000 or one component of the apparatus 1000, and the presence or absence of contact between a user and the apparatus 1000, the position or acceleration/deceleration of the apparatus 1000, and the temperature change of the apparatus 1000. The sensor component 1014 may include a proximity sensor configured to detect the presence of nearby objects without any physical contact. The sensor component 1014 may also include a light sensor, such as a CMOS or CCD image sensor for the imaging applications. In some embodiments, the sensor component 1014 may also include an acceleration sensor, a gyroscope sensor, a magnetic sensor, a pressure sensor or a temperature sensor.

The communication component 1016 is configured to facilitate communication, wired or wirelessly, between the apparatus 1000 and other devices. The apparatus 1000 may get access to a wireless network based on the communication standard, such as WiFi, 2G or 3G or their combinations. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the apparatus 1000 may be implemented by one or more application specific integrated circuits (ASIC), digital signal processors (DSP), digital signal processing devices (DSPD), programmable logic devices (PLD), field-programmable gate array (FPGA), controller, micro-controller, microprocessor, or other electronic components, for performing the above methods.

In exemplary embodiments, there is also provided a non-transitory computer-readable storage medium including instructions, such as included in the memory 1004, executable by the processor 1709 in the apparatus 1000, for performing the above methods. For example, the non-transitory computer-readable storage medium may be a ROM, a RAM, a CD-ROM, a magnetic tape, a floppy disc, an optical data storage device, and the like.

Figure 11:
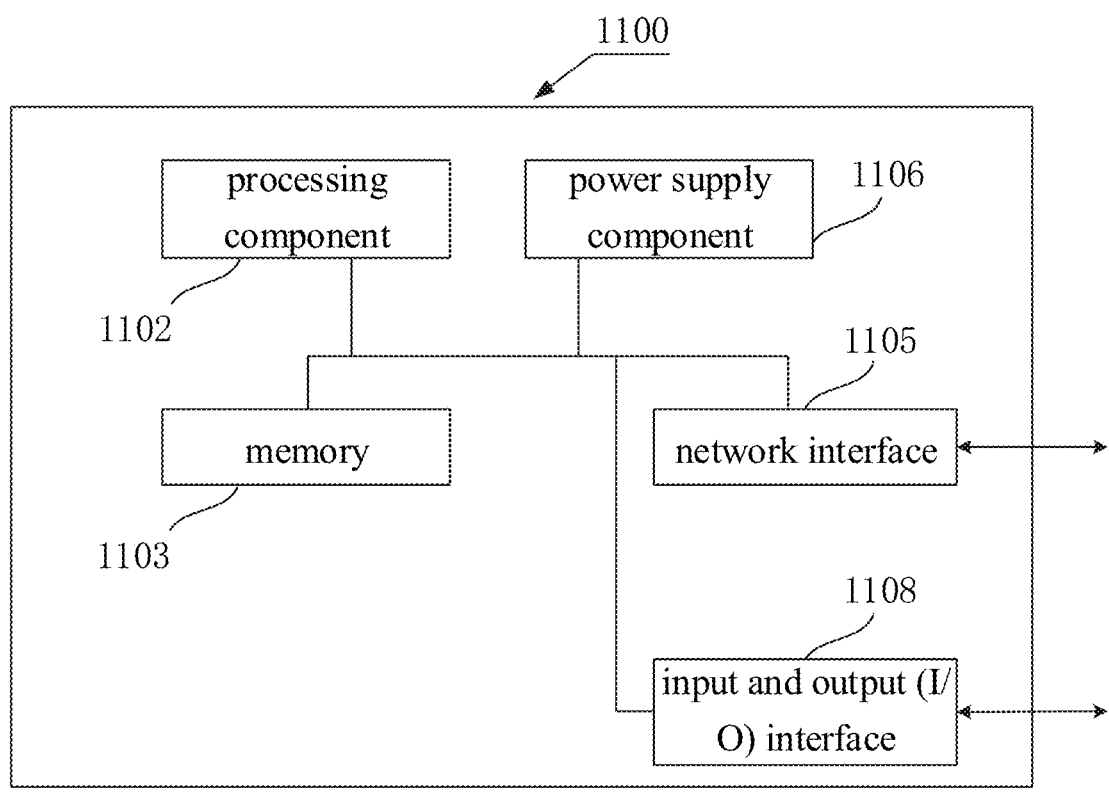
FIG. 11 is a block diagram showing a data transmission apparatus according to an exemplary embodiment.

FIG. 11 is a block diagram showing a data transmission apparatus according to an exemplary embodiment. For example, the data transmission apparatus 1100 may be provided as a server. The data transmission apparatus 1100 includes a processing component 1102, which further includes one or more processors, and a memory resource represented by the memory 1103, for storing instructions that can be executed by the processing component 1102, such as application programs. The application program stored in the memory 1103 may include one or more modules each corresponding to a set of instructions. In addition, the processing component 1102 is configured to execute instructions to perform the above-mentioned method.

The data transmission apparatus 1100 may also include a power supply component 1106 configured to perform power management of the data transmission apparatus 1100, a wired or wireless network interface 1105 configured to connect the data transmission apparatus 1100 to a network, and an input and output (I/O) interface 1108. The data transmission apparatus 1100 can operate based on an operating system stored in the memory 1103, such as Windows Server™, Mac OS X™, Unix™, Linux™, FreeBSD™ or the like.

A non-transitory computer-readable storage medium is provided. For example, the non-transitory computer-readable storage medium can be ROM, random access memory (RAM), CD-ROM, magnetic tape, floppy disk, optical data storage device, etc. When the instructions in the storage medium are executed by the processor of the data transmission apparatus 1000 or the data transmission apparatus 1100, the data transmission apparatus 1000 or the data transmission apparatus 1100 is caused to execute the following methods. The method includes: performing rate matching on a codeword corresponding to a target transmission block to obtain a target codeword when time-frequency resources required by the target transmission block in a burst transmission are greater than available time-domain resources of a target time slot; in which the number of bits of the target codeword is not greater than the number of bits of an available physical bearer of the target time slot; and transmitting the target codeword in the available time-domain resources of the target time slot through a first set of antenna components and a pre-configured second set of antenna components respectively; in which, the first set of antenna components and the second set of antenna components have the same hardware configuration information and resource allocation information. With the data transmission method provided in embodiments of the present disclosure, two sets of antenna components with the same hardware configuration information and resource allocation information are used to respectively transmit the target codeword after the rate matching, and the transmit diversity gain can be obtained, so as to ensure the reliability of the service in the scenario where the time-frequency resources actually required for burst transmission are greater than the available time-domain resources of the target time slot, thereby improving the transmission quality.

In an embodiment, transmitting the target codeword in the available time-domain resources of the target time slot through the first set of antenna components and the pre-configured second set of antenna components respectively may include: performing modulation mapping on a scrambling code bit block of the target codeword to generate a first complex modulation symbol block of the target codeword; performing phase rotation on each data in the first complex modulation symbol block of the target codeword according to a target angle to obtain a second complex modulation symbol block of the target codeword; and transmitting the first complex modulation symbol block of the target codeword in the available time-domain resources of the target time slot through the first set of antenna components, and transmitting the second complex modulation symbol block of the target codeword in the available time-domain resources of the target time slot through the pre-configured second set of antenna components.

In an embodiment, the method also includes: determining the target angle according to a pre-obtained offset reference value, the number of data in the first complex modulation symbol block of the target codeword, and the number of Inverse Fast Fourier Transform (IFFT) points used in generating a complex time-domain symbol of the target codeword.

In an embodiment, transmitting the target codeword in the available time-domain resources of the target time slot through the first set of antenna components and the pre-configured second set of antenna components respectively may include: performing physical layer resource mapping on a scrambling code bit block of the target codeword to generate a first complex time-domain symbol of the target codeword; performing cyclic shift on each time-domain data in the first complex time-domain symbol of the target codeword using an offset reference value pre-obtained, to obtain a second complex time-domain symbol of the target codeword; transmitting the first complex time-domain symbol of the target codeword in the available time-domain resources of the target time slot through the first set of antenna components, and transmitting the second complex time-domain symbol of the target codeword in the available time-domain resources of the target time slot through the pre-configured second set of antenna components.

In an embodiment, the burst transmission includes: an uplink burst transmission or a downlink burst transmission.

The skilled artisan will easily think of other embodiments of the present disclosure after considering the description and practicing the art disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the disclosure being indicated by the following claims.

It is to be understood that the present disclosure is not limited to the precise structure described above and shown in the drawings, and various modifications and changes can be made without departing from its scope. The scope of the present disclosure is only limited by the appended claims.

What is claimed is:

1. A data transmission method, comprising:
performing rate matching on a codeword corresponding to a target transmission block to obtain a target codeword when time-frequency resources required by the target transmission block in a burst transmission are greater than available time-domain resources of a target time slot; wherein the number of bits of the target codeword is not greater than the number of bits of an available physical bearer of the target time slot; and transmitting the target codeword in the available time-domain resources of the target time slot through a first set of antenna components and a pre-configured second set of antenna components respectively; wherein, the first set of antenna components and the second set of antenna components have the same hardware configuration information and resource allocation information.

2. The method of claim 1, wherein transmitting the target codeword in the available time-domain resources of the target time slot through the first set of antenna components and the pre-configured second set of antenna components respectively comprises:

performing modulation mapping on a scrambling code bit block of the target codeword to generate a first complex modulation symbol block of the target codeword;

performing phase rotation on each data of the first complex modulation symbol block of the target codeword at a target angle to obtain a second complex modulation symbol block of the target codeword; and transmitting the first complex modulation symbol block of the target codeword in the available time-domain resources of the target time slot through the first set of antenna components, and transmitting the second complex modulation symbol block of the target codeword in the available time-domain resources of the target time slot through the pre-configured second set of antenna components.

3. The method of claim 2, further comprising:

determining the target angle according to a pre-obtained offset reference value, the number of data in the first complex modulation symbol block of the target codeword, and the number of Inverse Fast Fourier Transform (IFFT) points used in generating a complex time-domain symbol of the target codeword.

4. The method of claim 1, wherein transmitting the target codeword in the available time-domain resources of the target time slot through the first set of antenna components and the pre-configured second set of antenna components respectively comprises:

performing physical layer resource mapping on a scrambling code bit block of the target codeword to generate a first complex time-domain symbol of the target codeword;

performing cyclic shift on each time-domain data in the first complex time-domain symbol of the target codeword using an offset reference value pre-obtained, to obtain a second complex time-domain symbol of the target codeword; and transmitting the first complex time-domain symbol of the target codeword in the available time-domain resources of the target time slot through the first set of antenna components, and transmitting the second complex time-domain symbol of the target codeword in the available time-domain resources of the target time slot through the pre-configured second set of antenna components.

5. The method of claim 1, characterized in that, the burst transmission comprises: an uplink burst transmission or a downlink burst transmission.

6. A data transmission apparatus, comprising:
a processor; and
a memory configured to store instructions executable by the processor;

wherein the processor is configured to:

perform rate matching on a codeword corresponding to a target transmission block to obtain a target codeword when time-frequency resources required by the target transmission block in a burst transmission are greater than available time-domain resources of a target time slot; wherein the number of bits of the target codeword is not greater than the number of bits of an available physical bearer of the target time slot; and transmit the target codeword in the available time-domain resources of the target time slot through a first set of antenna components and a pre-configured second set of antenna components respectively; wherein, the first set of antenna components and the second set of antenna components have the same hardware configuration information and resource allocation information.

7. The apparatus of claim 6, wherein the processor is configured to:

perform modulation mapping on a scrambling code bit block of the target codeword to generate a first complex modulation symbol block of the target codeword;

perform phase rotation on each data in the first complex modulation symbol block of the target codeword according to a target angle to obtain a second complex modulation symbol block of the target codeword; and transmit the first complex modulation symbol block of the target codeword in the available time-domain resources of the target time slot through the first set of antenna components, and to transmit the second complex modulation symbol block of the target codeword in the available time-domain resources of the target time slot through the pre-configured second set of antenna components.

8. The apparatus of claim 7, wherein the processor is configured to:

determine the target angle according to a pre-obtained offset reference value, the number of data in the first complex modulation symbol block of the target codeword, and the number of Inverse Fast Fourier Transform (IFFT) points used in generating a complex time-domain symbol of the target codeword.

9. The apparatus of claim 6, wherein the processor is configured to:

perform physical layer resource mapping on a scrambling code bit block of the target codeword to generate a first complex time-domain symbol of the target codeword;

perform cyclic shift on each time-domain data in the first complex time-domain symbol of the target codeword using an offset reference value pre-obtained, to obtain a second complex time-domain symbol of the target codeword; and transmit the first complex time-domain symbol of the target codeword in the available time-domain resources of the target time slot through the first set of antenna components, and to transmit the second complex time-domain symbol of the target codeword in the available time-domain resources of the target time slot through the pre-configured second set of antenna components.

10. The apparatus of claim 6, wherein the burst transmission comprises: an uplink burst transmission or a downlink burst transmission.

11. A non-transitory computer-readable storage medium having computer instructions stored thereon, characterized in that, when the instructions are executed by a processor, a data transmission method is implemented, and the method comprises:

performing rate matching on a codeword corresponding to a target transmission block to obtain a target codeword when time-frequency resources required by the target transmission block in a burst transmission are greater than available time-domain resources of a target time slot; wherein the number of bits of the target codeword is not greater than the number of bits of an available physical bearer of the target time slot; and transmitting the target codeword in the available time-domain resources of the target time slot through a first set of antenna components and a pre-configured second set of antenna components respectively; wherein, the first set of antenna components and the second set of antenna components have the same hardware configuration information and resource allocation information.

12. The non-transitory computer-readable storage medium of claim 11, wherein transmitting the target codeword in the available time-domain resources of the target time slot through the first set of antenna components and the pre-configured second set of antenna components respectively comprises:

performing modulation mapping on a scrambling code bit block of the target codeword to generate a first complex modulation symbol block of the target codeword;

performing phase rotation on each data in the first complex modulation symbol block of the target codeword according to a target angle to obtain a second complex modulation symbol block of the target codeword; and transmitting the first complex modulation symbol block of the target codeword in the available time-domain resources of the target time slot through the first set of antenna components, and transmitting the second complex modulation symbol block of the target codeword in the available time-domain resources of the target time slot through the pre-configured second set of antenna components.

13. The non-transitory computer-readable storage medium of claim 12, wherein the method further comprises:

determining the target angle according to a pre-obtained offset reference value, the number of data in the first complex modulation symbol block of the target codeword, and the number of Inverse Fast Fourier Transform (IFFT) points used in generating a complex time-domain symbol of the target codeword.

14. The non-transitory computer-readable storage medium of claim 11, wherein transmitting the target codeword in the available time-domain resources of the target time slot through the first set of antenna components and the pre-configured second set of antenna components respectively comprises:

performing physical layer resource mapping on a scrambling code bit block of the target codeword to generate a first complex time-domain symbol of the target codeword;

performing cyclic shift on each time-domain data in the first complex time-domain symbol of the target codeword using an offset reference value pre-obtained, to obtain a second complex time-domain symbol of the target codeword; and transmitting the first complex time-domain symbol of the target codeword in the available time-domain resources of the target time slot through the first set of antenna components, and transmitting the second complex time-domain symbol of the target codeword in the available time-domain resources of the target time slot through the pre-configured second set of antenna components.

15. The non-transitory computer-readable storage medium of claim 11, wherein the burst transmission comprises: an uplink burst transmission or a downlink burst transmission.

* * * * *